United States Patent [19]

Copling

[11] 4,308,068

[45] Dec. 29, 1981

[54] CONCRETE COMPOSITIONS

[76] Inventor: William L. Copling, 615 W. Main, Cuba, Mo. 65453

[21] Appl. No.: 167,424

[22] Filed: Jul. 11, 1980

[51] Int. Cl.³ .............................................. C04B 7/00
[52] U.S. Cl. ...................................... 106/76; 106/93; 106/98; 106/99
[58] Field of Search ................ 106/74, 76, 84, 98, 106/99

[56] References Cited

U.S. PATENT DOCUMENTS

| | | | |
|---|---|---|---|
| 2,695,850 | 11/1954 | Lorenz | 106/76 |
| 3,256,105 | 6/1966 | Alford et al. | 106/84 |
| 3,508,936 | 4/1970 | Lyass et al. | 106/84 |

*Primary Examiner*—James Poer

[57] ABSTRACT

The addition of a mixture of sodium silicate and a nonionic surfactant to a pre-concrete mix results in concrete having greater compressive strength. When the mix additionally contains sawdust and clay, light weight, insulative building material, which applicant calls INSUL-WOOD, is provided.

12 Claims, No Drawings

CONCRETE COMPOSITIONS

BACKGROUND OF THE INVENTION

The present invention relates to building materials. It particularly relates to novel compositions for the preparation of concrete building materials and to building blocks prepared from such compositions. The invention further relates to novel low density concrete building materials having high resistance to cracking, good insulating properties and good overall strength and to building blocks prepared therefrom.

The use of Portland cement in the preparation of concrete blocks for building and other purposes is well known. These blocks have good strength but are heavy and have poor insulating properties. Furthermore, although these blocks have good compressive strength, they have poor tensile strength and tend to eventually develop cracks under stress. The addition of materials to Portland cement to reduce the weight of blocks made from the cement, to improve the insulating properties of such blocks, and to impart other desirable properties is also well known in the art. The addition of sawdust or other low density material to reduce the weight of the concrete blocks and to improve their insulating properties is shown in U.S. Pat. Nos. 889,569, 1,309,038, 1,463,123, 1,484,370, 2,057,330, 2,592,345, 2,899,325, 3,264,125, and 4,166,745. Besides sawdust, other low density materials such as wood shavings, bark particles, cellulosic fibers, asbestos and artificial fibers have been used.

Substances such as silicates, chlorides, nitrates and sulfates have been added to Portland cement to increase the binding of the particles in the concrete. The use of such additives is shown in U.S. Pat. Nos. 1,309,296, 1,463,123, 1,484,370, 2,057,330, 2,592,345, 3,264,125, and 3,311,483.

Despite these various improvements in concrete building materials, whether they contain or do not contain any of the various materials described above, blocks made from such materials do not weather well and eventually develop cracks under stress. In view of this, it is an object of the present invention to provide a concrete building material which overcomes the above-mentioned deficiencies. Other objects and features will be in part apparent and in part pointed out hereinafter. The invention accordingly comprises the products hereinafter described, the scope of the invention being indicated by the subjoined claims.

SUMMARY OF THE INVENTION

The present invention provides a novel building material. It has been found that the addition of a mixture of sodium silicate and a surfactant to a concrete pre-mix reduces the water requirement of the pre-mix and provides a concrete building material which sets up faster and has better compressive strength. While any form of sodium silicate may be used, it is preferred to use an aqueous solution containing about 40% by weight of sodium silicate. The preferred surfactants are nonionic surfactants such as long chain alcohols, particularly those having from about 10 to 25 carbon atoms, ethers such as the nonoxynols, polyethylene glycols, mono- and diesters of polyethylene glycols with long chain carboxylic acids, i.e. acids having from about 10 to 25 carbon atoms, ethers of polyethylene glycol with mono- and polyhydroxy alcohols, mixtures of two (2) or more said surfactants and the like. A suitable surfactant is a mixture of a long chain linear alcohol and an alkoxylate, sold under the name BASIC H by the Shaklee Corporation of Emeryville, Calif.

In a preferred embodiment of the invention, which applicant calls INSUL-WOOD, sawdust and clay are substituted for some or all of the gravel and sand in the concrete pre-mix to reduce the density of the concrete building material and to provide it with better insulating properties. Unless the mix is to be sprayed, it also preferably contains lime. The properties of building blocks prepared from the preferred mixture are not directly comparable to the properties of concrete building blocks but they have excellent compressive strength and, as compared to concrete blocks, better tensile strength and workability.

DETAILED DESCRIPTION OF THE INVENTION

In accordance with the present invention an aqueous solution containing a mixture of sodium silicate and nonionic surfactant, preferably BASIC H, is added to a premix for the preparation of concrete, and the resulting mixture blended until a mixture of substantially uniform consistency is obtained. The mixture is then sprayed, troweled or poured into molds of a desired shape and cured for periods of about 5 to 12 days. While the material has sufficient strength at the end of such time, it will continue to improve in compressive strength for some time thereafter.

The mixture of sodium silicate and nonionic surfactant contains from about 30 to 65 percent by weight of sodium silicate and from about 70 to 35 percent by weight of nonionic surfactant. Suitable pre-concrete mixes according to the present invention contain:

15 to 25 gallons sand;
10 to 20 gallons gravel;
5 to 15 gallons lime;
3 to 8 gallons Portland or other suitable cement; and,
3 to 5 gallons of water having dissolved therein from 1.2 to 1.8 oz. of sodium silicate and 1.5 to 2.5 oz. of a nonionic surfactant.

When sawdust or an equivalent thereof is added to the pre-concrete mix, suitable compositions according to the present invention contain:

40 to 60 gallons sawdust;
20 to 30 gallons cement;
5 to 15 gallons lime;
1.2 to 5 gallons clay; and,
8 to 12 gallons water having dissolved therein from 16 to 32 oz. sodium silicate and 4 to 6 oz. of a nonionic surfactant.

The amount of sawdust or other fibrous material can be increased to about 50 to 60 percent by volume without effecting the strength and other desirable properties of the building material. The sawdust should be dry to avoid excessive curing times and is preferably derived from hardwoods such as oak or hickory. In preparing the building material, it is preferred that the sawdust be wetted with a small amount of the sodium silicate-BASIC H mixture and then be mixed with the clay to seal the sawdust from excessive wetting and to provide a good bond with the cement. Unless the material is to be sprayed, lime is added, followed by cement and sufficient sodium silicate-BASIC H mixture to make a good mix for the purpose intended.

The sawdust-containing concrete building material can be cast into blocks, bricks, sheets, posts and so forth. It may also be used for doors, burial vaults, flower pots or the like wherever concrete, wood or substitutes therefor are used today. In view of its considerably lighter weight, items made from such sawdust-containing building material are more easily handled than concrete blocks, sheets, bricks or the like and, unlike concrete, can be readily nailed, screwed, sawed or drilled without special tools and without cracking or chipping.

Sawdust-containing building blocks in accordance with the present invention, weighing from about 20 to 30 pounds, depending on size and the amount of sawdust and clay substituted for the sand and gravel, have good compressive strength and good insulative and soundproofing properties. They are also termite resistant and they can bend slightly and do not sweat like concrete. As such, they are useful in building walls, floors, chimneys and the like. A building constructed of such blocks need only be sealed inside and out to preserve its insulative properties, and can be finished with a spray-on stucco material to hide the seams for an attractive, low-cost commercial or residential building. Top beams of 2×8's can be nailed, over polyethylene, directly to the top row of blocks without requiring bond blocks as with concrete blocks. Paneling or siding, if desired, can be nailed directly onto the walls, and doors and windows can be directly secured thereto for a better and tighter fit. If desired, suitable dyes and pigments may be added to the building material before it is cast to provide desired colors in the finished items or they may be painted or otherwise coated as desired after they are cured.

The invention will be more fully illustrated in the examples which follow. These examples are given by way of illustration and are not to be considered as limiting.

EXAMPLE I

A number of concrete blocks measuring 8×8×16" were prepared from a mix consisting of:

| | |
|---|---|
| 4 | 5-gal. buckets sand |
| 3 | 5-gal. buckets gravel |
| 2 | 5-gal. buckets lime |
| 1 | 5-gal. buckets Portland cement |
| 3 to 5 | gallons of water containing 1.9 oz. sodium silicate and 2.5 oz. BASIC H. |

Control blocks were similarly prepared except that the water did not contain sodium silicate and BASIC H.

The concrete was mixed in a cement mixer in the customary manner and cast into blocks which were cured for periods of 8 to 21 days. The blocks were then tested for their compressive strength. The results are given in Table I below. A (+) next to the identification number indicates that the blocks contained the sodium silicate-BASIC H mixture; a (−) indicates an absence of the mixture. Compressive strength is reported in pounds per square inch and the weight of the block is in pounds.

TABLE I

| Identification | Age (days) | Compressive Strength | Wt./Block |
|---|---|---|---|
| 1+ | 8 | 1159 | 38.1 |
| 2+ | 8 | 1033 | 36.4 |
| 3+ | 8 | 1109 | 38.5 |
| 4+ | 21 | 1273 | 38.0 |

TABLE I-continued

| Identification | Age (days) | Compressive Strength | Wt./Block |
|---|---|---|---|
| 5+ | 21 | 1449 | 38.3 |
| 6− | 21 | 676 | 38.0 |
| 7− | 21 | 584 | 36.8 |

EXAMPLE II

A number of sawdust corner blocks (C) measuring 8×8×16" were made from a mix consisting of:

| | |
|---|---|
| 10 | 5-gal. buckets sawdust |
| 5 | 5-gal. buckets Portland cement |
| 2 | 5-gal. buckets lime |
| .5 | 5-gal. buckets Missouri clay |
| 8 to 10 | gallons water |

As shown in Table II below, the blocks cast from a mix wherein the water included 1 qt. per gallon 40% sodium silicate (16 to 32 oz.) and 0.5 oz. per gallon BASIC H (4 to 5 oz.) are designated plus (+). Those blocks made without the sodium silicate-BASIC H admixture are designated minus (−).

Other than for the presence or absence of the sodium silicate-BASIC H admixture in the water, all of the blocks were made in the same way: The ten buckets of sawdust were loaded into a suitably sized cement mixer and the mixer was started. As the sawdust was tumbled in the mixer, sufficient water was added to wet the sawdust. The powdered clay, lime and cement were added one-by-one in the order mentioned to the wetted sawdust. When this mixture had been thoroughly mixed, sufficient water was then added to provide a mix with a suitable texture for casting. The mixture was then filled into molds, the molds vibrated and the mixture compressed under 3,000 lbs. compressive force. The blocks were then released from the molds and cured under ambient conditions for 28 days.

At the end of 28 days, the cured blocks were tested for compressive strength. The results are reported in Table II. Compressive strength is reported as the total load in pounds and the weight of the blocks is in pounds.

TABLE II

| Identification | Compressive Strength | Wt./Block |
|---|---|---|
| C+ | 69,800 | 27.2 |
| C+ | 69,500 | 27.75 |
| C+ | 71,000 | 28.5 |
| C− | 63,000 | 27.8 |

EXAMPLE III

Following the procedure of Example II, sawdust stretcher blocks (S) were made but were allowed to cure for only 5 or 12 days before testing. The results are reported in Table III. Compressive strength is reported in pounds per square inch and the weight of the blocks is in pounds.

TABLE III

| Identification | Age (days) | Compressive Strength | Wt./Block |
|---|---|---|---|
| S+ | 5 | 433 | 25.4 |
| S+ | 12 | 472 | 25.4 |
| S− | 5 | 408 | 24.4 |
| S− | 12 | 435 | 24.6 |

In view of the above, it will be seen that the several objects of the invention are achieved and other advantageous results attained. As various changes could be made in the above products without departing from the scope of the invention, it is intended that all matter contained in the above description shall be interpreted as illustrative and not in a limiting sense.

What is claimed is:

1. A pre-concrete mix comprising:
   15 to 25 gallons sand;
   10 to 20 gallons gravel;
   5 to 15 gallons lime;
   3 to 8 gallons cement; and,
   3 to 5 gallons of water having dissolved therein from about 1.2 to 1.8 oz. sodium silicate and from about 1.5 to 2.5 oz. of a nonionic surfactant.

2. A pre-concrete mix according to claim 1 wherein the cement is Portland cement.

3. A pre-concrete mix according to claim 2 wherein the nonionic surfactant is a mixture of a long chain linear alcohol and an alkoxylate.

4. A pre-concrete mix according to claim 3 which contains:
   20 gallons sand;
   15 gallons gravel;
   10 gallons lime;
   5 gallons Portland cement; and,
   3 to 5 gallons of water having dissolved therein 1.9 oz. sodium silicate and 2.5 oz. of a mixture of a long chain linear alcohol and an alkoxylate.

5. A concrete block prepared from the pre-concrete mix of claim 1.

6. A concrete block prepared from the pre-concrete mix of claim 4.

7. A pre-concrete mix comprising:
   40 to 60 gallons sawdust;
   20 to 30 gallons cement;
   5 to 15 gallons lime;
   1.2 to 5 gallons clay; and,
   8 to 12 gallons water having dissolved therein from about 16 to 32 oz. sodium silicate and from about 4 to 6 oz. of a nonionic surfactant.

8. A pre-concrete mix according to claim 7 wherein the cement is Portland cement.

9. A pre-concrete mix according to claim 8 wherein the nonionic surfactant is a mixture of a long chain linear alcohol and an alkoxylate.

10. A pre-concrete mix according to claim 9 which contains:
    50 gallons sawdust;
    25 gallons Portland cement;
    10 gallons lime;
    2.5 gallons clay; and,
    8 to 10 gallons water containing 16 to 32 oz. sodium silicate and 4 to 5 oz. of a mixture of a long chain linear alcohol and an alkoxylate.

11. A concrete block prepared from the pre-concrete mix of claim 7.

12. A concrete block prepared from the pre-concrete mix of claim 10.

* * * * *